(No Model.)

R. BROWN.
REEL ADJUSTMENT FOR LAWN MOWERS.

No. 536,126.  Patented Mar. 19, 1895.

Witnesses:
Geo. M. Anderson
Phill Mass.

Inventor:
Robert Brown
by E. W. Anderson
his Attorney.

UNITED STATES PATENT OFFICE.

ROBERT BROWN, OF RICHMOND, INDIANA.

REEL ADJUSTMENT FOR LAWN-MOWERS.

SPECIFICATION forming part of Letters Patent No. 536,126, dated March 19, 1895.

Application filed September 17, 1894. Serial No. 523,246. (No model.)

*To all whom it may concern:*

Be it known that I, ROBERT BROWN, a citizen of the United States, and a resident of Richmond, in the county of Wayne and State of Indiana, have invented certain new and useful Improvements in Reel Adjustments for Lawn-Mowers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
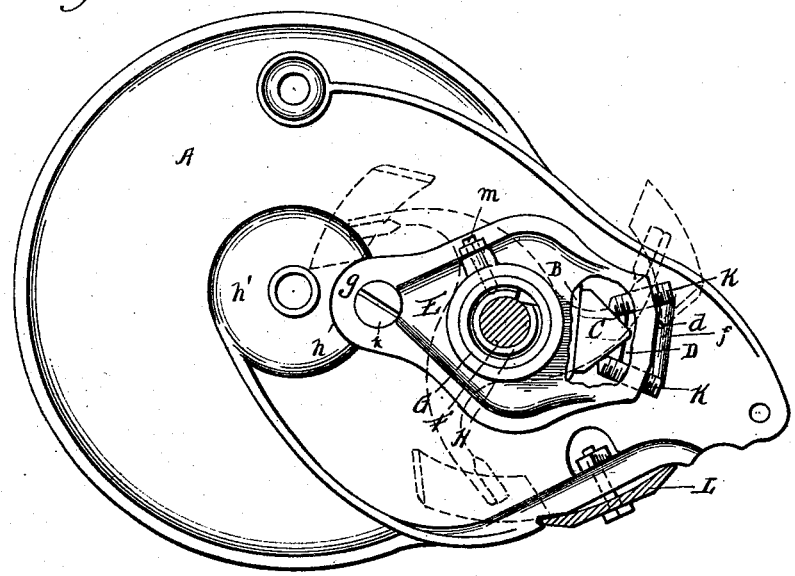
Figure 2:
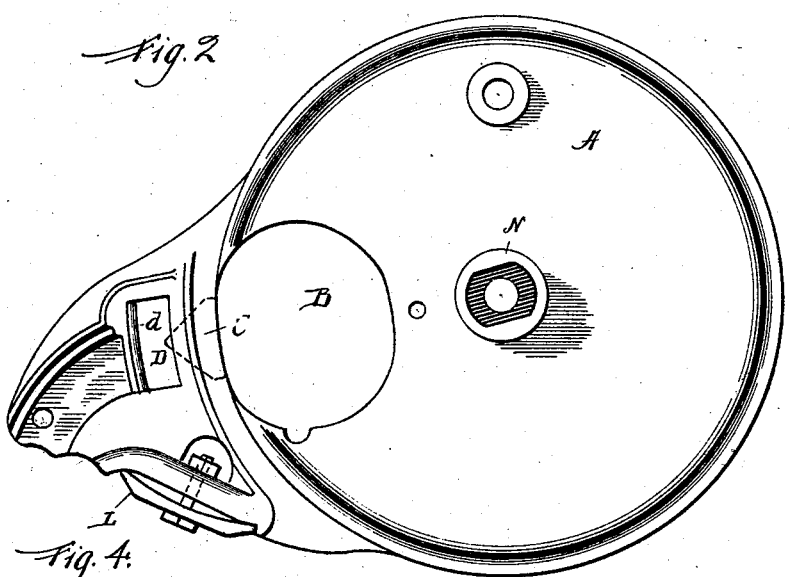
Figure 4:
Figure 3:
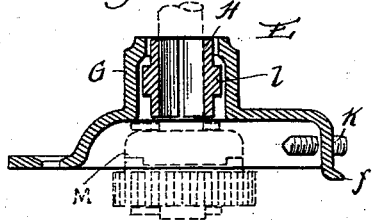

Figure 1 of the drawings is a representation of a vertical section of lawn mower, near end casting, with wheel and wheel shaft removed, the rotary cutter shown in dotted lines. Fig. 2 is a view on other side of end casting, with bearing E removed. Fig. 3 is a central vertical longitudinal section through bearing E, the clutch and pinion devices shown in dotted lines. Fig. 4 is a detail of split bushing.

The object of this invention is to provide an improved bearing for the reel shafts of lawn mowers whereby the reel may be easily and accurately adjusted with relation to the stationary cutter: and the invention consists in the novel construction and combination of parts, all as hereinafter described and pointed out in the appended claims.

Referring to the accompanying drawings, the letter A designates one of the heads, or ends castings, of the mower which is cast in an integral piece with an approximately circular opening B therethrough. At the front edge of said opening is an inwardly projecting, horizontal lug C of V-shape, its upper and lower surfaces forming inclined, converging bearing faces for the purpose presently to be described. Forward of said lug the head A is formed with a second and smaller opening D whose forward edge is raised to form an overhanging lip d.

E designates the bearing for the reel shaft F, said bearing comprising a chambered, integral casting, having at its forward end a small hooked lug f, which engages underneath the lip d of the opening D, and at its rear end with a convex ended lug g which loosely fits a concavity h in a boss h' of the casting A and is pivotally secured to said casting by a small screw bolt k. Said casting E is formed with a hollow extension G in which bears the shaft F. Said extension is preferably fitted with a split brass or bushing H, having a surrounding flange l which fits in an enlarged portion of the chamber of the extension, permitting the brass or bushing to move slightly to adjust itself to the reel shaft. Said brass or bushing is held in place by a set-screw m.

The forward end of casting E is provided with two adjusting screws K, K, both of which are arranged respectively to take a bearing upon each oblique face of the V-shaped lug C. By the manipulation of these screws, the casting E can be readily and accurately adjusted to bring the reel shaft and reel into proper relation with the stationary cutter bar L, the entire casting moving on the bolt k as a pivot. By providing inclined contact faces for the adjusting screws K, I not only secure a more accurate adjustment, but the arrangement permits the adjustment to be more easily made, since said screws act in the nature of a wedge, and not by direct pressure, as does a screw working at right angles to the contact surface. I am also enabled to place the screws nearer together and in a more accessible position. The chamber of said casting forms a seat for the clutch and pinion devices M which drive the reel shaft. N is the bearing for the drive wheel.

The above described adjustment greatly simplifies the construction of the machine, as the castings A require no fitting or machining after coming from the mold, except the milling of the bearing N. The castings E merely require to be fitted with the screws m, k, and K, K, and the brass or bushing H. The adjustment is also free from any strain or twist on the machine in case the same adjustment is not given each end.

It will be understood that each end of the machine is to be provided with a similar device.

It will be further observed that when the hollow or chambered casting E is applied to the head or end casting, its chamber entirely incloses the lug C, thereby protecting it from liability of being broken in shipment, or by direct blows thereon from any cause.

Having thus described my invention, what

I claim as new, and desire to secure by Letters Patent, is—

1. In a lawn mower, the combination with the head or end casting of the frame having upon its inner face a projecting lug having upper and lower inclined faces, of a hollow or chambered bearing casting pivotally secured to the inner face of said head or end casting, and having at its forward end portion two oblique screw seats, adjusting screws held in said seats, and bearing respectively upon the faces of said lug, said lug being inclosed within the hollow or chamber of said casting, substantially as specified.

2. In a lawn mower, the combination with a head or end casting A, having therein the openings B and D, the latter of which is raised at its forward edge to form an overhanging lip, said head or end casting, also having upon its inner face and forward of the opening B, a projecting lug C having oblique upper and lower bearing faces, of the chambered bearing casting E pivotally secured to the inner face of the head or end casting over said openings, and inclosing said lug, said bearing casting having a hooked lug which movably engages said overhanging lip, and adjusting screws K, K, carried by the casting E and arranged to bear against opposite faces of said lug, substantially as specified.

3. In a lawn mower, the combination with the head or end casting A having the openings B and D and the V-shaped lug C, of the chambered casting D pivotally secured to said casting A over its opening B, and movably engaging the wall of the opening D, said casting having adjusting screws K, K, having a bearing against opposite faces of the lug C, and an extension G fitted with a brass or bushing H, substantially as specified.

In testimony whereof I affix my signature in presence of two witnesses.

ROBERT BROWN.

Witnesses:
 GEORGE H. PARMELEE,
 PHILIP C. MASI.